(12) United States Patent
Raam

(10) Patent No.: US 9,760,502 B2
(45) Date of Patent: *Sep. 12, 2017

(54) ENCRYPTED TRANSPORT SOLID-STATE DISK CONTROLLER

(71) Applicant: Seagate Technology LLC, Cupertino, CA (US)

(72) Inventor: Farbod Michael Raam, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,463

(22) Filed: Jun. 26, 2015

(65) Prior Publication Data

US 2015/0293858 A1  Oct. 15, 2015

Related U.S. Application Data

(63) Continuation of application No. 14/112,322, filed as application No. PCT/US2012/034452 on Apr. 20, 2012, now Pat. No. 9,069,703.

(Continued)

(51) Int. Cl.
*G06F 12/00* (2006.01)
*G06F 12/14* (2006.01)
(Continued)

(52) U.S. Cl.
CPC ........ *G06F 12/1408* (2013.01); *G06F 21/606* (2013.01); *G06F 21/78* (2013.01); *G11C 16/22* (2013.01)

(58) Field of Classification Search
CPC .... G06F 12/1408; G06F 21/606; G06F 21/78; G11C 16/22
See application file for complete search history.

(56) References Cited

U.S. PATENT DOCUMENTS 6,341,085 B1   1/2002   Yamagami et al.
6,347,051 B2   2/2002   Yamagami et al.
(Continued)

FOREIGN PATENT DOCUMENTS

CN   1498405 A   5/2004
CN   1808457 A   7/2006
(Continued)

OTHER PUBLICATIONS

Science and Tehnical Information Center Search Strategy Report (requested May 9, 2017).*

(Continued)

*Primary Examiner* — Sharon Lynch
(74) *Attorney, Agent, or Firm* — Hall Estill Attorneys at Law

(57) ABSTRACT

Method and apparatus for transferring protected data. In some embodiments, an encrypted transport solid state drive (SSD) has a non-volatile memory and a controller circuit. The controller circuit is configured to, responsive to receipt of a write command from a host device to store an encrypted data set to the non-volatile memory, decrypt the encrypted data set using a first encryption key to generate a decrypted data set, apply lossless compression to the decrypted data set to generate a decrypted compressed data set, encrypt the decrypted compressed data set using a second encryption key to generate an encrypted compressed data set, and to direct storage of the encrypted compressed data set in the non-volatile memory.

18 Claims, 6 Drawing Sheets

Related U.S. Application Data

(60) Provisional application No. 61/480,518, filed on Apr. 29, 2011.

(51) Int. Cl.
  *G06F 21/60* (2013.01)
  *G11C 16/22* (2006.01)
  *G06F 21/78* (2013.01)

(56) References Cited

U.S. PATENT DOCUMENTS

| | | | | |
|---|---|---|---|---|
| 6,367,019 | B1* | 4/2002 | Ansell | G06F 21/10 380/277 |
| 7,706,538 | B1* | 4/2010 | Hughes | H04L 9/00 380/269 |
| 7,814,316 | B1 | 10/2010 | Hughes et al. | |
| 8,533,550 | B2* | 9/2013 | Khan | G06F 3/0608 348/14.13 |
| 8,862,902 | B2* | 10/2014 | Hars | G06F 12/14 713/193 |
| 8,924,816 | B2* | 12/2014 | Khan | G06F 3/0608 348/14.13 |
| 9,317,362 | B2* | 4/2016 | Khan | G06F 11/1068 |
| 9,396,136 | B2* | 7/2016 | Hars | G06F 12/14 |
| 2004/0117642 | A1 | 6/2004 | Mowery et al. | |
| 2005/0100163 | A1 | 5/2005 | Buer | |
| 2006/0218647 | A1 | 9/2006 | Hars et al. | |
| 2007/0192592 | A1 | 8/2007 | Goettfert et al. | |
| 2008/0072070 | A1 | 3/2008 | LaMacchia et al. | |
| 2008/0205635 | A1 | 8/2008 | Jaquette et al. | |
| 2010/0185802 | A1* | 7/2010 | Asnaashari | G06F 12/0246 711/103 |
| 2010/0281340 | A1* | 11/2010 | Franceschini | G06F 12/0246 714/763 |
| 2010/0306176 | A1* | 12/2010 | Johnson | G06F 17/30085 707/664 |
| 2010/0306283 | A1* | 12/2010 | Johnson | G06F 17/30085 707/803 |
| 2011/0055664 | A1* | 3/2011 | Burd | G06F 3/0608 714/768 |
| 2011/0126007 | A1* | 5/2011 | Eastman | G06F 17/30067 713/165 |
| 2011/0162086 | A1 | 6/2011 | Rogel et al. | |
| 2011/0320915 | A1* | 12/2011 | Khan | G06F 3/0608 714/773 |
| 2012/0278635 | A1* | 11/2012 | Hars | G06F 12/14 713/193 |
| 2013/0326313 | A1* | 12/2013 | Khan | G06F 3/0608 714/774 |
| 2014/0337689 | A1* | 11/2014 | Khan | G06F 3/0608 714/773 |
| 2015/0052370 | A1* | 2/2015 | Hars | G06F 12/14 713/193 |

FOREIGN PATENT DOCUMENTS

| | | |
|---|---|---|
| CN | 101763485 A1 | 6/2010 |
| JP | 2007219802 A | 8/2007 |
| WO | 2005036406 A1 | 4/2005 |

OTHER PUBLICATIONS

International Search Report in the parent PCT/US2012/034452, 3 Pages.
Written Opinion in the parent PCT/2012/034452, 4 Pages.
Notification of the First Office Action for CN 2012800310473, Jul. 2, 2014, 18 pages.
European Search Report for EP 12776230, Oct. 21, 2014, 5 pages.
Dec. 10, 2014 List of References Used in Art Rejections in Cases Related to U.S. Appl. No. 14/112,322, 1 page.
K. Takeuchi, "NAND Successful as a Media for SSD," IEEE International Solid-State Circuits Conference Tutorial T7, 2008, pp. 1-81 (81 sheets).
Chanik Park, Prakash Talawar, Daesik Won, Myungjin Jung, Jungbeen IM, Suksan Kim and Youngjoon Choi, "A High Performance Controller for NAND Flash-based Solid State Disk (NSSD)," in Non-volatile Semiconductor Memory Workshop (NVSMW) Digest Technical Papers, 2006, pp. 17-20 (4 sheets).
R. Micheloni, L. Crippa, and A. Marelli, "InsideNANDFlashMemories," Springer Science +Business Media B.V. 2010, ISBN 978-990-481-9430-8, pp. 38-43 and related footnote pp. 52-53, 4 sheets.

* cited by examiner

ENCRYPTED TRANSPORT SOLID-STATE DISK CONTROLLER

RELATED APPLICATIONS

This application is a continuation of co-pending U.S. patent application Ser. No. 14/112,322 filed on Oct. 17, 2013 and which issues as U.S. Pat. No. 9,069,703 on Jun. 30, 2015, which is a 371 of PCT/US12/34452 filed Apr. 20, 2012, which claims benefit of U.S. Provisional Patent Application No. 61/480,518 filed Apr. 29, 2011.

BACKGROUND

Field

Advancements in non-volatile storage technology are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, including as a process, an article of manufacture, an apparatus, a system, a composition of matter, and a computer readable medium such as a computer readable storage medium (e.g., media in an optical and/or magnetic mass storage device such as a disk, or an integrated circuit having non-volatile storage such as flash storage) or a computer network wherein program instructions are sent over optical or electronic communication links. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of one or more of systems, methods, articles of manufacture, and computer readable media in accordance with the concepts described herein. As is discussed in more detail in the Conclusions, the invention encompasses all possible modifications and variations within the scope of the issued claims.

Figure 1A:
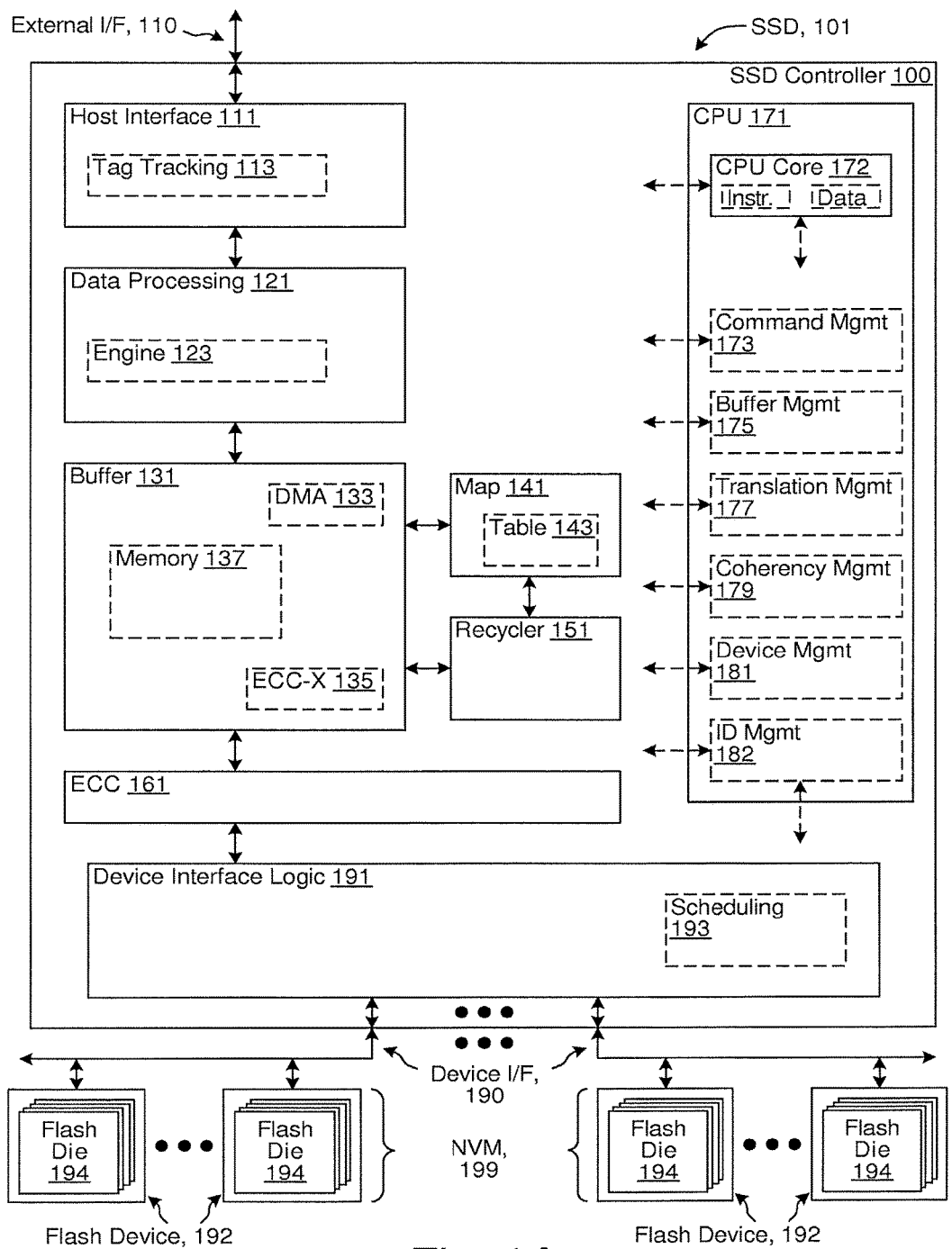
FIG. 1A illustrates selected details of an embodiment of a Solid-State Disk (SSD) including an SSD controller using encrypted transport techniques for managing nonvolatile storage, such as implemented via Non-Volatile Memory (NVM) elements (e.g., flash memories).

| List of References Symbols in Drawings | |
|---|---|
| Ref. Symbol | Element Name |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 171 | Device Management |
| 172 | Identity Management |
| 190 | Device Interfaces |
| 171 | Device Interface Logic |
| 192 | Flash Device |
| 193 | Scheduling |
| 194 | Flash Die |
| 199 | NVM |
| 200 | Encrypted Transport SSD |
| 202 | Computer |

-continued

| List of References Symbols in Drawings | |
|---|---|
| Ref. Symbol | Element Name |
| 204 | Remote Server |
| 206 | VGA Display |
| 208 | VGA Video Signals |
| 210 | VGA Controller |
| 212 | Secure Communication Link (SSD-Remote Server) |
| 214 | Flash Memory |
| 216 | Secure Physical Boundary (SSD Controller) |
| 218 | Secure Communication Link (SSD-VGA Controller) |
| 220 | Secure Physical Boundary (VGA Controller) |
| 222 | Coupling (between remote server and computer) |
| 224 | Coupling (between computer and SSD controller) |
| 300 | Host |
| 302 | Encrypted Transport SSD |
| 304 | Encrypted Data |
| 306 | Flash Memory |
| 308 | SSD Controller |
| 310 | Write Data Path |
| 312 | Encrypted-Formatted Data |
| 314 | Session Decryption Layer |
| 316 | Lossless Compression Layer |
| 318 | Internal Encryption Layer |
| 320 | Back-End Encryption Layer |
| 322 | Write-Formatting Layer |
| 326 | Decrypted Data |
| 328 | Compressed Data |
| 330 | Encrypted-Compressed Data |
| 336 | Back-End Encrypted Data |
| 338 | Read De-Formatting Layer |
| 340 | Back-End Decryption Layer |
| 342 | Internal Decryption Layer |
| 344 | Read Decompression Layer |
| 346 | Session Encryption Layer |
| 401 | Read Data Path |
| 402 | Start |
| 403 | Open Channel Request |
| 404 | Host-Side Authenticate |
| 405 | Host-Side Key Exchange |
| 405X | Host-Side Secure Traffic Exchange |
| 406 | Host-Side TCG Ops/Storage Access |
| 409 | Close Channel Request |
| 412 | Host Actions |
| 413 | Open Channel Accept |
| 414 | Controller-Side Authenticate |
| 415 | Controller-Side Key Exchange |
| 415X | Controller-Side Secure Traffic Exchange |
| 416 | Controller-Side TCG Ops/Storage Access |
| 417 | Close Channel Accept |
| 419 | Destroy Key |
| 501 | Receive Write Data |
| 502 | Decrypt Write Data |
| 503 | Compress Decrypted Data |
| 504 | Encrypt Compressed Data |
| 505 | (Re)encrypt Encrypted Data |
| 506 | Modulate (Re)encrypted Data |
| 507 | Store Modulated Data |
| 508 | Host-side Secure Traffic to Controller-Side |
| 510 | Controller-side Secure Traffic to Host-Side |
| 511 | Provide Encrypted Data |
| 512 | Encrypt Decompressed Data |
| 513 | Decompress (Re)Decrypted Data |
| 514 | Decrypt Decrypted Data |
| 515 | Decrypt Demodulated Data |
| 516 | Demodulate Read Data |
| 517 | Read Data |
| 522K | Key = $K_H$ |
| 524K | Key = $K_B$ |
| 525K | Key = $K_A$ |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

At least some of the various shorthand abbreviations (e.g. acronyms) defined here refer to certain elements used herein.

| Acronym | Description |
|---|---|
| AES | Advanced Encryption standard |
| AHCI | Advanced Host Controller Interface |
| API | Application Program Interface |
| ASCII | American Stancard Code for Information Interchange |
| BCH | Bose Chaudhuri Hocquenghem |
| ATA | Advanced Technology Attachment (AT Attachment) |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DES | Data Encryption Standard |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | External Seria Advanced Technology Attachment |
| GPS | Global Positioning System |

-continued

| Acronym | Description |
| --- | --- |
| HDD | Hard Disk Drive |
| I/O | Input/Output |
| IC | Integrated Circuit |
| IDE | Integrated Drive Electronics |
| JPEG | Joint Photographic Experts Group |
| LAN | Local Area Network |
| LB | Logical Block |
| LBA | Logical Block Address |
| LDPC | Low-Density Parity-Check |
| LPN | Logical Page Number |
| LZ | Lempel-Ziv |
| MLC | Multi-Level Cell |
| MMC | MultiMediaCard |
| MPEG | Moving Picture Experts Group |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| POS | Point of Sale |
| RAID | Redundant Array of Inexpensive/Independent Disks |
| RS | Reed-Solomon |
| RSA | Rivest, Shamir & Adleman |
| SAN | Storage Attached Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |
| SSD | Solid-State Disk/Drive |
| TCG | Trusted Computing Group |
| UFS | Unified Flash Storage |
| USB | Universal Serial Bus |
| VF | Virtual Function |
| WAN | Wide Area Network |

Some storage peripherals are enabled to use a transport encryption layer to protect data sent to the storage peripheral from a host. The host encrypts data internally prior to sending the data to the storage peripheral to be stored in a storage medium (e.g., an NVM). Similarly, data read from the storage peripheral and sent to the host is assumed to have the same encryption as when it was written, and the host decrypts the data for use. From the perspective of the host, the data is encrypted on the full path to and from the storage medium.

In some embodiments, storage peripherals, such as SSDs, internally encrypt data, via a so-called "back-end" encryption, before storing the data to the storage medium (such as an array of NAND flash chips), and decrypt the data after reading the encrypted data from the storage medium. In SSDs, the back-end encryption serves to protect the data and to provide a scrambling property that in some scenarios improves endurance of the NAND flash chips. For example, the back-end encryption is used to protect firmware of the SSD that is stored in the storage medium, independent of any other forms of encryption used for host data.

Some storage peripherals operate according to a security protocol, such as a storage security sub-system class (e.g. TCG Opal), and are enabled to encrypt data received from a host and to be written to a storage medium, and further enabled to decrypt data read from the storage medium. In some embodiments, the security protocol encryption/decryption uses metadata, such as a storage address range, to determine in part an encryption/decryption key. In further embodiments, there are one or more address ranges, each associated with a respective key. In further embodiments, there is a global "none of the above" key if none of the address ranges matches. According to various embodiments, the security protocol encryption/decryption is one or more of: the same as the transport encryption/decryption; different from the transport encryption/decryption; the same as the back-end encryption/decryption; and different from the back-end encryption/decryption.

In some embodiments, storage peripherals, such as SSDs, compress data received from a host prior to storing the data to a storage medium (such as an array of NAND flash chips). Compressing includes one or more of lossy compression based on data type (e.g. JPEG and/or MPEG data), lossless compression performed in a localized manner (e.g. LZ compression), data deduplication, and any reversible transformation reducing storage required to represent data being compressed. Compressing data prior to storing advantageously reduces write-amplification and/or increases apparent storage capacity in various scenarios. However, data that has been encrypted (e.g., for transport encryption) is, in some scenarios, not compressible.

In some embodiments, a storage peripheral such as an SSD performs a key exchange with a host to determine key(s) used for a transport encryption layer, and optionally and/or selectively determines under which conditions each key is used. When the storage peripheral receives transport encrypted data from the host, the storage peripheral optionally and/or selectively uses a selected one of the key(s) to decrypt the data according to the transport encryption. The decrypted data is then compressed. In further embodiments where a security protocol, such as TCG Opal, is used, the compressed data is optionally and/or selectively encrypted according to the security protocol. In still further embodiments where there is a backend encryption different from the security protocol, the compressed and optionally and/or selectively encrypted data is further encrypted by the back-end encryption before the data is modulated for writing to the storage medium.

In other embodiments, the transport encryption is re-used rather than TCG OpaL. That is, after compression, the compressed data is re-encrypted using the transport encryption key(s)/algorithm.

When data is being read back from the storage medium and returned to the host, the operations described above for storing data are effectively reversed so that the original encrypted data is returned to the host.

Example encryption algorithms are: DES, triple-DES, AES-12S, AES-256, RSA, and other public key encryption algorithms.

In some situations, write amplification results when a host storage write of a particular size results in a plurality of writes (each having a size of, e.g., a multiple of the particular size) to flash memory of an SSD. The plurality of writes arises from, for example, erasing a portion of flash memory before writing (e.g., programming) the portion, wear leveling, garbage collection, and flash memory management operations that result in system data writes. An example calculation of write amplification is an amount of data written to flash memory on behalf of a particular collection of host writes (including, e.g., system writes to complete writing of host data associated with the host writes), divided by an amount of data written by the particular collection of host writes. In some usage scenarios, compression of the data written by the particular collection of host writes enables reducing the amount of data written to the flash memory on behalf of the particular collection of host writes. Since the amount of data written to the flash memory on behalf of the particular collection of host writes is reduced, the write amplification is thereby reduced.

In some embodiments, accessing compressed data of varying-sized quanta in NVM provides improved storage efficiency in some usage scenarios. For example, an SSD controller receives data (that is not compressed) from a computing host (e.g., relating to a disk write command), compresses the data, and stores the compressed data into flash memory. In response to a subsequent request from the computing host (e.g., relating to a disk read command), the SSD controller reads the compressed data from the flash memory, decompresses the compressed data, and provides the decompressed data to the computing host. The compressed data is stored in the flash memory according to varying-sized quanta, the quanta size varying due to, e.g., compression algorithm, operating mode, and compression effectiveness on various data. The SSD controller decompresses the data in part by consulting an included map table to determine where header(s) are stored in the flash memory. The SSD controller parses the header(s) obtained from the flash memory to determine where appropriate (compressed) data is stored in the flash memory. The SSD controller decompresses the appropriate data from the flash memory to produce the decompressed data to provide to the computing host.

In various embodiments, an SSD controller includes a host interface for interfacing with a computing host, an interface for interfacing with NVM such as flash memory, and circuitry for controlling the interfaces and performing (and/or controlling various aspects of the performing) compressing and decompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as an SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
receiving data from one or more Non-Volatile Memories (NVMs);
preparing the received data;
processing the prepared data according to a sequence of operations;
providing results of the processing to a computing host;
wherein the sequence of operations comprises
decrypting the prepared data,
decompressing the decrypted data,
re-encrypting the decompressed data, and
providing the re-encrypted data as the results; and
wherein the decompressing is symmetric with respect to a lossless compressing.

EC2) The method of EC1, wherein the decrypting is first decrypting and the preparing comprises second decrypting.

EC3) The method of EC1, wherein the processing is selective according to a selected one of a plurality of modes, and the sequence of operations is a first sequence of operations corresponding to a first one of the modes.

EC4) The method of EC3,
wherein a second sequence of operations corresponds to a second one of the modes; and
wherein the second sequence of operations comprises providing the decompressed data as the results.

EC5) A method comprising:
receiving data from a computing host;
processing the received data according to a sequence of operations;
preparing results of the processing to enable storing in one or more Non-Volatile Memories (NVMs);

wherein the sequence of operations comprises
decrypting the received data,
compressing the decrypted data,
re-encrypting the compressed data, and
providing the re-encrypted data as the results; and
wherein the compressing is lossless.

EC6) The method of EC5, wherein the preparing comprises encrypting.

EC7) The method of EC5, wherein the processing is selective according to a selected one of a plurality of modes, and the sequence of operations is a first sequence of operations corresponding to a first one of the modes.

EC8) The method of EC7,
wherein a second sequence of operations corresponds to a second one of the modes; and
wherein the second sequence of operations comprises providing the compressed data as the results.

EC9) A method comprising:
receiving data from one or more Non-Volatile Memories (NVMs);
preparing the received data;
processing the prepared data according to a selected one of a plurality of modes;
providing results of the processing to a computing host;
wherein a first one of the modes comprises
decrypting the prepared data,
decompressing the decrypted data as first decompressed data,
re-encrypting the first decompressed data as first re-encrypted data, and
providing the first re-encrypted data as the results; and
wherein a second one of the modes comprises
decompressing the prepared data as second decompressed data,
re-encrypting the second decompressed data as second re-encrypted data, and
providing the second re-encrypted data as the results.

EC10) The method of EC9, wherein the preparing comprises decrypting.

EC11) The method of EC9, wherein the decompressing is symmetric with respect to a lossless compressing.

EC12) The method of EC9, wherein a third one of the modes comprises providing the first decompressed data as the results.

EC13) A method comprising:
receiving data from a computing host;
processing the received data according to a selected one of a plurality of modes;
preparing results of the processing to enable storing in one or more Non-Volatile Memories (NVMs);
wherein a first one of the modes comprises
decrypting the received data,
compressing the decrypted data,
re-encrypting the compressed, decrypted data; and
providing the re-encrypted data as the results; and
wherein a second one of the modes comprises
providing the compressed, decrypted data as the results.

EC14) The method of EC13, wherein the preparing comprises encrypting.

EC15) The method of EC13, wherein the re-encrypting is symmetrical with respect to the decrypting.

EC16) The method of EC13, wherein the re-encrypting is according to a security protocol and the decrypting is according to a transport protocol.

EC17) The method of EC13, further comprising securely exchanging transport session encryption keys with the computing host and using at least a portion of the transport session encryption keys in the decrypting.

EC18) The method of EC17, wherein the securely exchanging transport session encryption keys comprises:
establishing a secure link between the computing host and a Solid-State Disk (SSD) using an asymmetric key exchange, and
exchanging the transport session encryption keys within the secure link.

EC19) The method of EC13, wherein
a third one of the modes comprises
compressing the received data,
encrypting the compressed data, and
providing the compressed, encrypted data as the results.

EC20) The method of EC19, wherein the encrypting is according to a security protocol.

EC21) The method of EC19, wherein a fourth one of the modes comprises providing the compressed data as the results.

EC22) The method of EC13, wherein the preparing comprises scrambling and/or modulating the results.

EC23) The method of EC13, wherein the preparing comprises encrypting.

EC24) The method of EC13, further comprising the storing.

EC25) The method of EC24, wherein the storing is via a flash memory interface.

EC26) The method of EC13, wherein the receiving is via a storage interface compatible with a storage interface standard.

EC27) The method of EC13, further comprising providing the data as encrypted data, via the computing host.

EC28) The method of EC13, wherein the decrypting, the compressing, and the re-encrypting are implemented at least in part via a controller of a Solid-State Disk (SSD).

EC29) A system comprising:
a means for receiving data from a computing host;
a means for selectively enabling one of a plurality of modes of operation, the modes comprising
an encrypted mode of operation, implemented at least in part via
a means for decrypting the received data,
a means for compressing the decrypted data,
a means for re-encrypting the compressed, decrypted data, and
a means for providing the re-encrypted data as encrypted mode write data; and
a non-encrypted mode of operation, implemented at least in part via
a means for compressing the received data, and
a means for providing the compressed, received data as non-encrypted mode write data;
a means for selecting the enabled mode write data,
a means for encrypting the selected mode write data; and
a means for formatting the encrypted, selected mode write data for storage in one or more Non-Volatile Memories (NVMs).

EC30) The system of EC29, further comprising a means for securely exchanging transport session encryption keys and for using at least a portion of the transport session encryption keys for decrypting the received data as received encrypted data.

EC31) The system of EC29, wherein one or more of the means for compressing are enabled to perform a lossless compression for advantageously reducing write amplification.

EC32) The system of EC29, wherein the means for compressing the decrypted data and the means for compressing the received data have at least a portion in common.

EC33) The system of EC29, wherein the means are via a controller of a Solid-State Disk (SSD), and the NVMs are flash memories comprised in the SSD.

EC34) The system of EC33, further comprising a means for interfacing the controller with the computing host.

EC35) The system of EC34, wherein the means for interfacing is compatible with a storage interface standard.

EC36) The system of EC34, further comprising all or any portions of the computing host.

EC37) The system of EC29, further comprising a means for interfacing with the NVMs.

EC38) The system of EC37, wherein the means for interfacing comprises a flash memory interface.

EC39) The system of EC29, further comprising at least one of the NVMs.

EC40) The system of EC29, further comprising:
a means for interfacing requests from the computing host, the requests relating
to information stored in the NVMs; and
a means for interfacing to the NVMs.

EC41) The system of EC40, wherein the means are collectively implemented in a single Integrated Circuit (IC).

EC42) The system of EC40, wherein the means are comprised in a Solid-State Disk (SSD).

EC43) The system of EC30, wherein the means for securely exchanging transport session encryption keys comprises:
a means for establishing a secure link between a host and a Solid-State Disk (SSD) using an asymmetric key exchange; and
a means for exchanging the transport session encryption keys within the secure link.

EC44) A tangible computer readable medium having a set of instructions stored therein that when executed by a processing element of a storage device cause the processing element to perform and/or control operations comprising:
receiving data from a computing host;
selectively enabling one of a plurality of modes of operation, the modes comprising
an encrypted mode of operation, implemented at least in part via
  decrypting the received data,
  compressing the decrypted data,
  re-encrypting the compressed, decrypted data, and
  providing the re-encrypted data as encrypted mode write data; and
a non-encrypted mode of operation, implemented at least in part via
  compressing the received data, and
  providing the compressed, received data as non-encrypted mode write data;
selecting the enabled mode write data;
encrypting the selected mode write data; and
formatting the encrypted, selected mode write data for storage in one or more Non-Volatile Memories (NVMs).

EC45) The tangible computer readable medium of EC44, wherein the tangible computer readable medium and the processing element are comprised in a Solid-State Disk (SSD).

EC46) The tangible computer readable medium of EC45, wherein at least one of the NVMs is comprised in the SSD.

EC47) Any of the foregoing ECs, having or referring to decrypting and re-encrypting, wherein anyone or more of the decrypting and the re-encrypting are performed within a secure physical boundary.

EC48) Any of the foregoing ECs, having or referring to decrypting, re-encrypting, compressing, and decompressing, wherein anyone or more of the decrypting, the re-encrypting, the compressing, and the decompressing are performed within a secure physical boundary.

EC49) Any of the foregoing ECs, having or referring to a secure physical boundary, wherein the secure physical boundary is implemented via a single Integrated Circuit (IC).

EC50) Any of the foregoing ECs, having or referring to transport session encryption keys, wherein the transport session encryption keys are compatible with symmetric key encryption/decryption.

EC51) Any of the foregoing ECs, having or referring to symmetric key encryption/decryption, wherein the symmetric key encryption/decryption is compatible with one or more of
AES 128,
AES 192, and
AES 256.

EC52) Any of the foregoing ECs, having or referring to lossless compression, wherein the lossless compression comprises a Lempel-Ziv (LZ) compression.

EC53) Any of the foregoing ECs, having or referring to lossless compression, wherein the lossless compression comprises a dictionary coder LZ77 compression.

EC54) Any of the foregoing ECs, having or referring to an SSD controller, wherein the SSD controller is implemented in a single Integrated Circuit (IC).

EC55) Any of the foregoing ECs, having or referring to an SSD controller and NVMs, wherein the SSD controller and the NVMs are comprised in an SSD.

EC56) Any of the foregoing ECs, having or referring to NVMs, wherein at least one of the NVMs comprises one or more flash memories.

EC57) Any of the foregoing ECs having or referring to a storage interface standard, wherein the storage interface standard comprises one or more of
a Universal Serial Bus (USB) interface standard,
a Compact Flash (CF) interface standard,
a MultiMediaCard (MMC) interface standard,
an embedded MMC (eMMC) interface standard,
a Thunderbolt interface standard,
a UFS interface standard,
a Secure Digital (SD) interface standard,
a Memory Stick interface standard,
an xD-picture card interface standard,
an Integrated Drive Electronics (IDE) interface standard,
a Serial Advanced Technology Attachment (SATA) interface standard,
an external SATA (eSATA) interface standard,
a Small Computer System Interface (SCSI) interface standard,
a Serial Attached Small Computer System Interface (SAS) interface standard,
a Fibre Channel interface standard, an Ethernet interface standard, and
a Peripheral Component Interconnect express (PCIe) interface standard.

EC58) Any of the foregoing ECs having or referring to a flash memory interface, wherein the flash memory interface is compatible with one or more of
an Open NAND Flash Interface (ONFI),
a Toggle-mode interface,
a Double-Data-Rate (DDR) synchronous interface,
a DDR2 synchronous interface;
a synchronous interface, and
an asynchronous interface.

EC59) Any of the foregoing ECs having or referring to a computing host, wherein the computing host comprises one or more of
a computer,
a workstation computer,
a server computer,
a storage server,
a Storage Attached Network (SAN),
a Network Attached Storage (NAS) device,
a Direct Attached Storage (DAS) device,
a storage appliance,
a Personal Computer (PC),
a laptop computer,
a notebook computer,
a netbook computer,
a tablet device or computer,
an ultrabook computer,
an electronic reading device (an e-reader),
a Personal Digital Assistant (PDA),
a navigation system,
a (handheld) Global Positioning System (GPS) device,
an automotive control system,
an automotive media control system or computer,
a printer, copier or fax machine or all-in-one device,
a Point Of Sale POS device,
a cash-register,
a media player,
a television,
a media recorder,
a Digital Video Recorder (DVR),
a digital camera,
a cellular handset,
a cordless telephone handset, and
an electronic game.

EC60) Any of the foregoing ECs having or referring to a at least one flash memory, wherein at least a portion of the at least one flash memory comprises one or more of
NAND flash technology storage cells, and
NOR flash technology storage cells.

EC61) Any of the foregoing ECs having or referring to a at least one flash memory, wherein at least a portion of the at least one flash memory comprises one or more of
Single-Level Cell (SLC) flash technology storage cells, and
Multi-Level Cell (MLC) flash technology storage cells.

EC62) Any of the foregoing ECs having or referring to a at least one flash memory, wherein at least a portion of the at least one flash memory comprises one or more of
polysilicon technology-based charge storage cells, and
silicon nitride technology-based charge storage cells.

EC63) Any of the foregoing ECs having or referring to a at least one flash memory, wherein at least a portion of the at least one flash memory comprises one or more of
two-dimensional technology-based flash memory technology, and
three-dimensional technology-based flash memory technology.

System

FIG. 1A illustrates selected details of an embodiment of SSD 101 including an SSD controller using a transport encryption layer for managing non-volatile storage, such as implemented via NVM elements (e.g., flash memories). The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organization of one or more of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Rash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability, where redundancy is at a flash device (e.g., multiple ones of Rash Device 192) level and/or a flash die (e.g., Rash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Rash Device 192 via Device Interfaces 190. Device Interface Logic 191 is enabled to send data to/from the instances of Rash Device 192 according to a protocol of Rash Device 192. Device Interface Logic 191 includes Scheduling 193 to selectively sequence control of the instances of Rash Device 192 via Device Interfaces 190. For example, in some embodiments, Scheduling 193 is enabled to queue operations to the instances of Rash Device 192, and to selectively send the operations to individual ones of the instances of Rash Device 192 (or Rash Die 194) as individual ones of the instances of Rash Device 192 (or Rash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing them. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows. CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
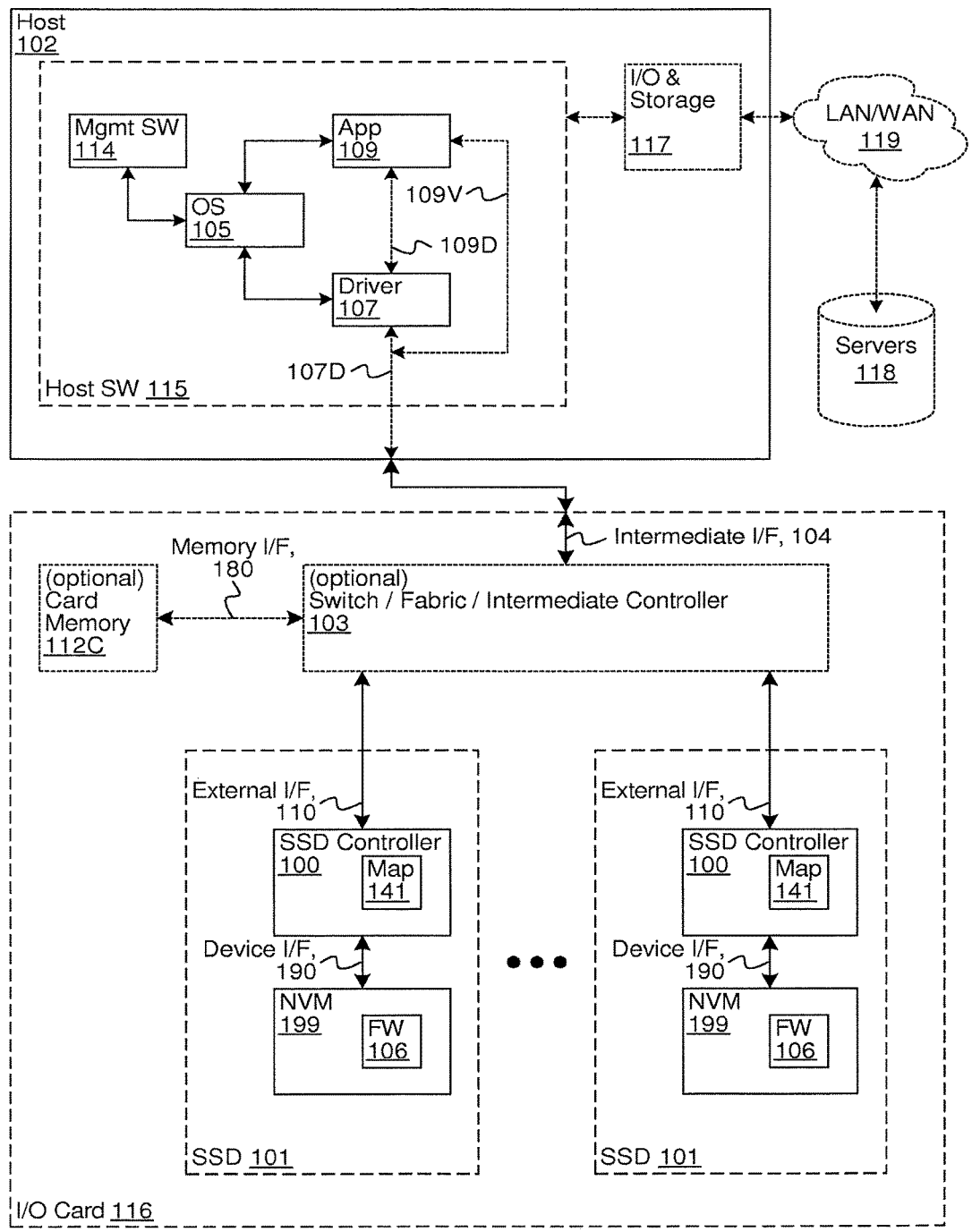
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch I Fabric I Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to anyone or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of nonstandard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA enabled application. Dotted-arrow 109D is representative of Application←→I/O Device Communication (e.g. bypass via a driver or bypass via a VF for an application), e.g. an ONA enabled application and an ONA-enabled driver communicating with an SSD, such as without the application using the OS as an intermediary. Dotted-arrow 109V is representative of Application←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments where Host 102 is a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional 110 & Storage Devices/Resources 117 and optional LAN/WAN 119) with one or more local and/or remote servers (e.g. optional Servers 118). The communication enables, for example, local and/or remote access, management, and/or usage of anyone or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as anyone or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xDpicture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Example of Transport Encryption Usage and Operation

Figure 2:
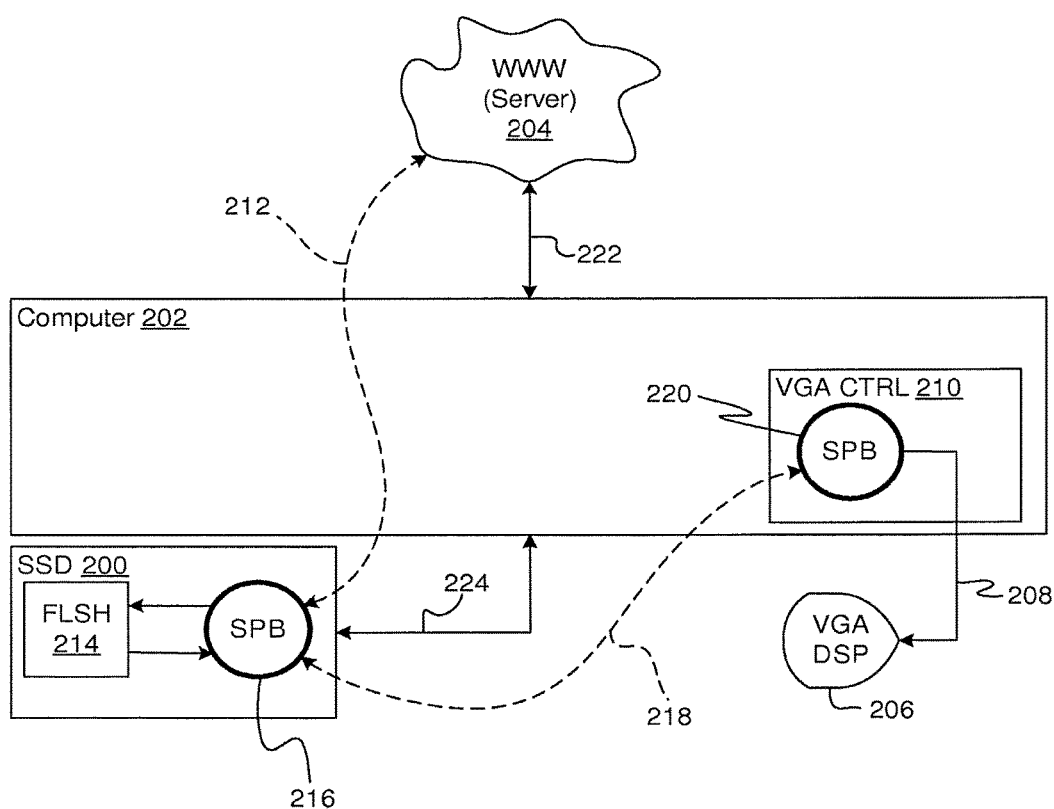
FIG. 2 illustrates an example of a specific application of an SSD using encrypted transport techniques for managing non-volatile storage such as illustrated in FIG. 1A.

FIG. 2 illustrates an example of a specific application of Encrypted Transport SSD 200 using encrypted transport techniques for managing non-volatile storage such as illustrated in FIG. 1A. Computer 202 is used to select and to pay for rental of a pay-per-view movie that is then downloaded via the Internet from Remote Server 204, temporarily stored on Encrypted Transport SSD 200, and delivered to VGA Display 206 for viewing. Thus the movie is protected (e.g., from theft) while transiting from the server until emerging from the Computer as VGA Video Signals 208, controlling the VGA Display.

The movie is transported from the server in encrypted format, is stored within the SSD in encrypted format, and is delivered to VGA Controller 210 in encrypted format. In some situations, VGA Video Signals 208 are not suitable for high-quality video recording, thus reducing the likelihood that the movie will be stolen as the VGA Video Signals.

The computer begins an encrypted transport of the movie by establishing a secure communication link (illustrated conceptually by dashed-line 212) between the Remote Server and Encrypted Transport SSD 200. Once the secure communication link is established, the Remote Server, acting as a host, exchanges encryption keys with the SSD. The remote server encrypts the movie, according to the exchanged keys, and transfers the encrypted movie via the secure communication link to Encrypted Transport SSD 200 for temporary storage awaiting viewing.

Encrypted Transport SSD 200 compresses the downloaded movie for storage in Flash Memory 214. In some embodiments and/or usage scenarios, the compressing, enables, e.g., minimizing flash memory write amplification, and/or increasing apparent storage capacity. In some situations, however, an encrypted movie is not effectively compressed. Therefore, within a Secure Physical Boundary (SSD Controller) 216 (e.g., implemented as a single integrated circuit), the SSD uses the exchanged encryption key to decrypt the downloaded movie. The decrypted movie is compressed and then re-encrypted before being exported from Secure Physical Boundary (SSD Controller) 216 to Flash Memory 214 for storage. When the download is complete, the Remote Server disconnects the secure communication link.

To begin viewing the movie, the Computer establishes a secure communication link (illustrated conceptually by dashed-line 218) between VGA Controller 210 and Encrypted Transport SSD 200, providing the storage address of the downloaded movie. There is an encryption key exchange between the VGA Controller, acting as a host, and Encrypted Transport SSD 200. Encrypted Transport SSD 200 retrieves the stored movie from Flash Memory 214, decrypts the retrieved movie within Secure Physical Boundary (SSD Controller) 216, decompresses the result, re-encrypts using the exchanged encryption key, and then exports the re-encrypted movie to VGA Controller 210. The VGA Controller receives the encrypted movie and, within Secure Physical Boundary (VGA Controller) 220 of VGA Controller 210, decrypts the movie using the exchanged encryption key, and provides VGA control signals 208, enabling viewing the movie via VGA Display 206. At no point outside of Secure Physical Boundary (SSD Controller) 216 and Secure Physical Boundary (VGA Controller) 220 is the movie available in an unencrypted form subject to tampering or theft.

In some embodiments, the secure communication link between the Remote Server and the SSD uses several elements: Coupling 222 between the Remote Server and the Computer, transport through the Computer, and Coupling 224 between the Computer and the SSD. Coupling 222 between the remove server and the Computer is via, e.g., Remote Server 204 and a coupling to the Internet (not illustrated), transport via the Internet, and another coupling to the Internet via a networking interface of Computer 202. Coupling 224 between the Computer and the SSD is via, e.g., a storage interface of Computer 202 (not illustrated) and an external interface of Encrypted Transport SSD 200. In some embodiments, the secure communication link between the VGA Controller and the SSD uses several elements: transport through the Computer, and Coupling 224 between the Computer and the SSD.

In various embodiments, Encrypted Transport SSD 200 is implemented in accordance with one or more elements illustrated in FIG. 1A. For example, Flash Memory 214 corresponds to NVM 199 of FIG. 1A, and/or Coupling 224 between the SSD and the Computer corresponds to one or more External Interfaces 110 of FIG. 1A. In various contexts, the specific application illustrated in FIG. 2 is implemented in accordance with one or more elements illustrated in FIG. 1B. For example, Encrypted Transport SSD 200 corresponds to an instance of SSD 101 in FIG. 1B, and Computer 202 corresponds to Host 102 of FIG. 1B.

Transport Encryption Layer Embodiments

In the example above, Remote Server 204 was the host during a download and storage of the pay-per-view movie. Then, during viewing, VGA Controller 210 performed as a host. An example of a "host," as the term is used with respect to FIGS. 2, 3A, 3B, 4, and 5, is a system platform that performs an encryption key exchange and data encryption/decryption during an encrypted transport of data with specific embodiments of an encrypted transport SSD.

Figure 3A:
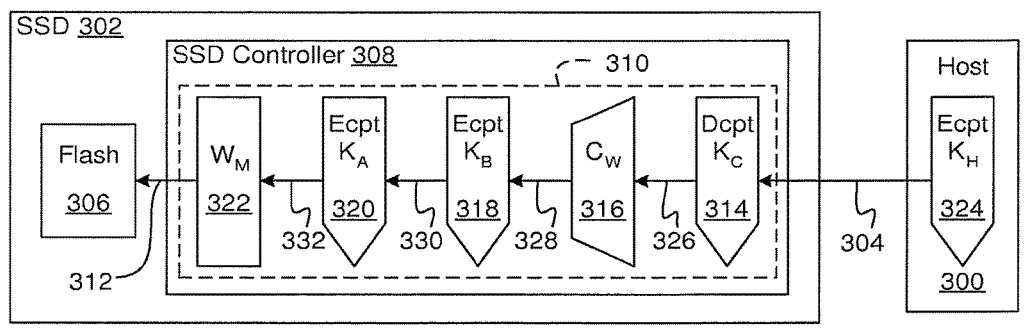
FIG. 3A illustrates selected details of an embodiment of a write data path functionality of an encrypted transport SSD, the write data path functionality including a two-stage post-compression encryption.
Figure 3B:
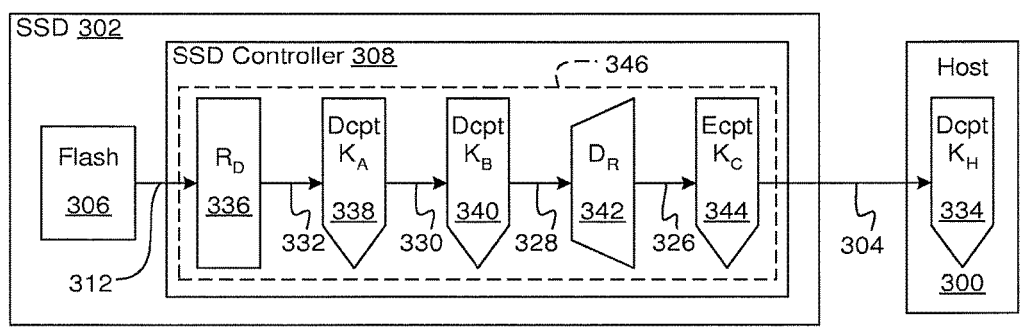
FIG. 3B illustrates selected details of an embodiment of a read data path functionality of the encrypted transport SSD of FIG. 3A, the read data path functionality including a two-stage pre-decompression decryption.
Figure 4:
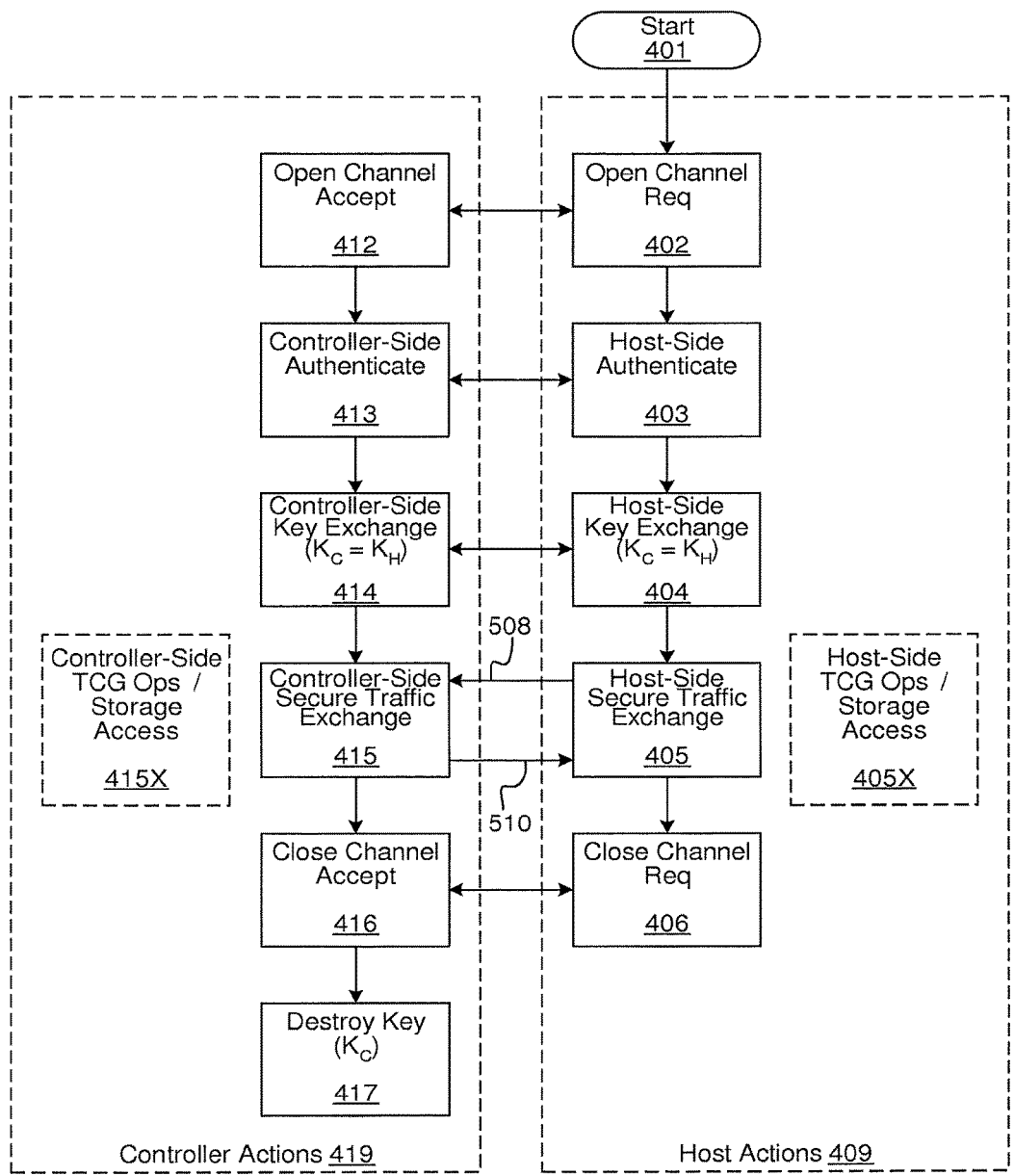
FIG. 4 is a flow diagram illustrating an embodiment of creation, use, and abandonment of a secure communication link between a host and an SSD controller for performing an encrypted transport data transfer, e.g., in a context of an encrypted transport SSD.
Figure 5:
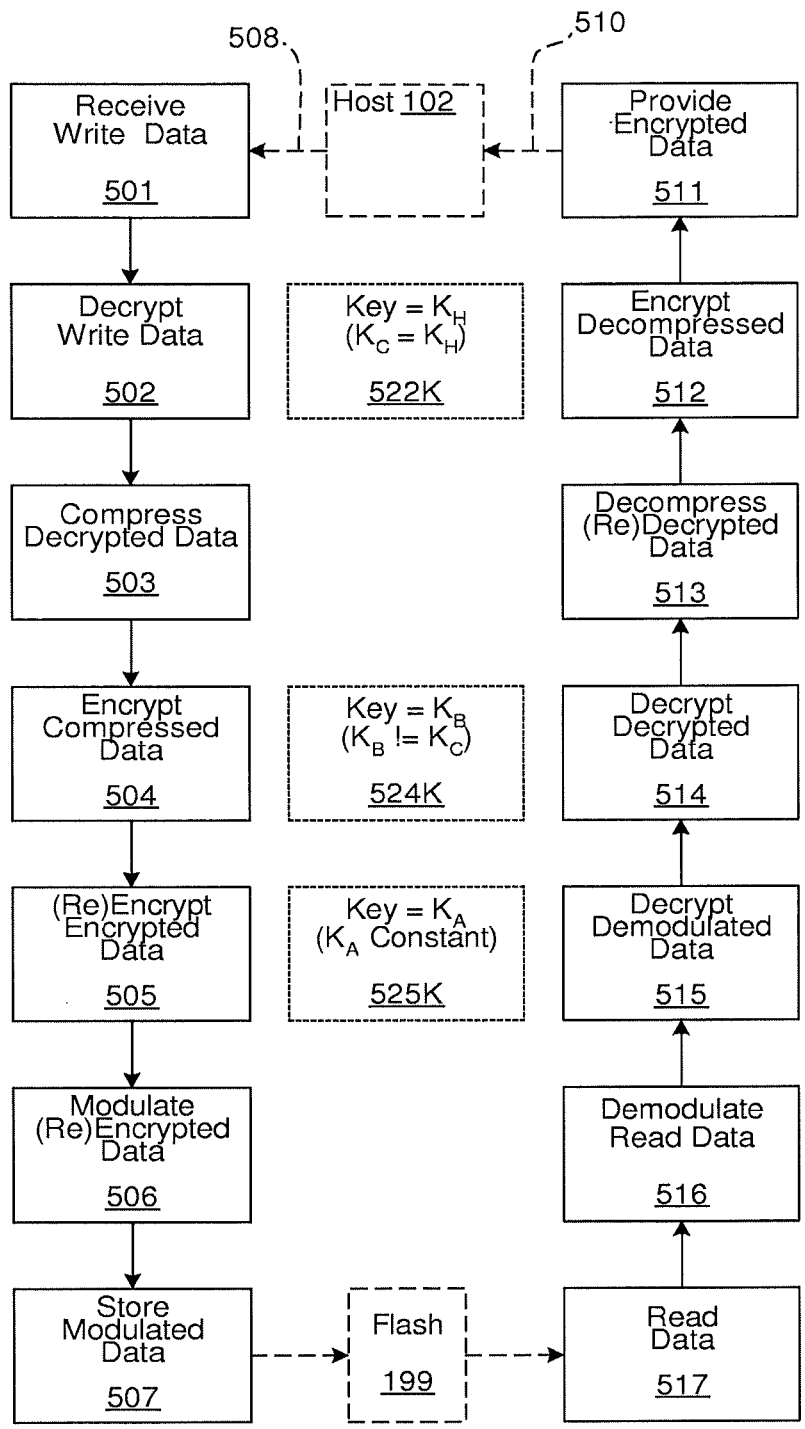
FIG. 5 is a flow diagram illustrating an embodiment of data path control and/or operation of an encrypted transport SSD controller.

FIGS. 3A, 3B, 4, and 5 illustrate details of specific embodiments of functionality of an encrypted transport SSD. FIG. 3A illustrates a write data path functionality including a two-stage post-compression data encryption. FIG. 3B illustrates a read data path functionality including a two-stage pre-decompression decryption, compatible with "reversing" the write data path functionality of FIG. 3A. FIG. 4 illustrates hand-shaking used to establish a secure communication link for exchange of encryption/decryption keys and for data transfer between a host and an encrypted transport SSD. FIG. 5 illustrates write and read data transfer operations between a host and an encrypted transport SSD, including data paths such as illustrated in FIGS. 3A and 3B.

The block diagram of FIG. 3A illustrates Host 300 communicatively coupled with Encrypted Transport SSD 302 for exchanging encryption keys and for transporting Encrypted Data 304 for storage in Flash Memory 306. Encrypted Transport SSD 302 includes Flash Memory 306 and SSD Controller 308. In various embodiments and/or usage scenarios, Encrypted Transport SSD 302, SSD Controller 308, and Flash Memory 306 correspond, respectively to SSD 101, SSD Controller 100, and NVM 199 of FIG. 1A.

In a specific embodiment, SSD Controller 308 includes Write Data Path 310 for processing a transport of encrypted data between Host 300 and Flash Memory 306. Write Data Path 310 includes Session Decryption Layer 314, Lossless Compression Layer 316, Internal Encryption Layer 318, Back-End Encryption Layer 320, and Write-Formatting Layer 322. Write Data Path 310 receives Encrypted Data 304 and exports Encrypted-Formatted Data 312 for storage in Flash Memory 306.

In some embodiments, any portions of one or more operations of the Write Data Path 310 are performed by portions of one or more elements of SSD 101 of FIG. 1A. For example, portions of Data Processing 121 in conjunction with portions of Buffer 131, ECC 161, Device Interface Logic 191, and Device Interfaces 190 perform the operations of Write Data Path 310. In other embodiments, one or more of the aforementioned layers are implemented in one or more dedicated hardware logic circuitry blocks and/or one or more embedded processors and associated firmware. When SSD Controller 308 is implemented within a single integrated circuit, the single integrated circuit provides a secure physical boundary (not illustrated) ensuring that decrypted information in Decrypted Data 326 and Compressed Data 328, as well as any exchanged keys, are secure (e.g., from tampering or theft).

In some embodiments, before encrypted data is written to Flash Memory 306, Host 300 and Encrypted Transport SSD 302 establish a secure connection, and exchange session encryption/decryption keys. In some scenarios, the Host issues a Write Command, a Storage Address, and then begins encrypting data using the session encryption key (illustrated as KH in FIG. 3A), and exporting results 304.

SSD Controller 308 receives Encrypted Data 304, and decrypts the received data at Session Decryption Layer 314, using the session decryption key (illustrated as $K_c$ in FIG. 3A), producing Decrypted Data 326. Decrypted Data 326 is compressed by Lossless Compression Layer 316, producing Compressed Data 328. In some embodiments and/or usage scenarios, lossless compression advantageously reduces a write amplification factor and/or increases an apparent storage capacity of data written to flash memory by reducing the amount of data that must be stored. In a specific embodiment, the compression technique is an LZ lossless compression (e.g., s dictionary coder such as LZ77).

Compressed Data 328 is encrypted by Internal Encryption Layer 318, producing Encrypted-Compressed Data 330. In a specific embodiment, Internal Encryption Layer 318 uses the session encryption technique used by Host 300 to produce Encrypted Data 304 (e.g., the same cryptographic algorithm with $K_B = K_H$). In another embodiment, the encryption technique of Internal Encryption Layer 318 is determined by a security protocol such as, for example, TCG Opal. In a specific embodiment of such a security protocol, the encryption key $K_B$ used by Internal Encryption Layer 318 is determined at least in part by meta-data such as a storage address range. In another embodiment, there is a plurality of address ranges, each associated with a respective encryption key. In further embodiments, there is a global "none of the above" key if none of the address ranges matches.

In some embodiments, Encrypted-Compressed Data 330 is encrypted a second time at Back-End Encryption Layer 320 using encryption key $K_A$, producing Back-End Encrypted Data 332. In another specific embodiment, the Back-End Encryption Layer 320 uses an encryption technique and/or key(s) different from that used by Internal Encryption Layer 318 (e.g., $K_A \ne K_B$). In yet other embodiments, a scrambler is used instead of encryption.

Back-End Encrypted Data 332 is processed by Write-Formatting Layer 322 via techniques such as storage address mapping, encoding for error correction, and modulating, producing Encrypted-Formatted Data 312 that is exported to Flash Memory 306.

In another embodiment of Write Data Path 310 (not illustrated), Internal Encryption Layer 318 is not present, enabling direct input of Compressed Data 328 to Back-End Encryption Layer 320. In various embodiments, a single-stage, post-compression encryption write data path employs one of (a) back-end encryption, (b) transport session encryption as used by Host 300, and (c) encryption determined by a security protocol.

In another embodiment of Write Data Path 310 (not illustrated), data sent by a host is not encrypted but is sent as clear-text. Session Decryption Layer 314 is not present, enabling direct input of data from the Host to Lossless Compression Layer 316. A value for internal encryption key $K_B$ is determined by a security protocol. Back-End Encryption Layer 320 uses key KA to perform the back-end encryption.

In another embodiment of Write Data Path 310 (not illustrated), both Session Decryption Layer 314 and Internal Encryption Layer 318 are not present. Clear-text data input from the Host is applied directly to Lossless Compression Layer 316, and Compressed Data 328 is applied directly to Back-End Encryption Layer 320. A value for back-end encryption key $K_A$ is one of (a) a back-end encryption key value, and (b) a value determined by a security protocol.

The block diagram shown in FIG. 3B illustrates Host 300 communicatively coupled with Encrypted Transport SSD 302 for exchanging encryption keys and for transporting Encrypted Data 304 from storage in Encrypted Transport SSD 302 to Host 300. The figure illustrates selected details of an embodiment of a read data path functionality compatible with the write data path functionality of an encrypted transport SSD illustrated in FIG. 3A, the read data path functionality including a two-stage pre-decompression decryption.

In a specific embodiment, SSD Controller 308 includes Read Data Path 346 for processing a transport of encrypted data between Flash Memory 306 and Host 300. The Read Data Path 346 includes Read De-Formatting Layer 336, Back-End Decryption Layer 338, Internal Decryption Layer 340, Read Decompression Layer 342, and Session Encryption Layer 344. The Read Data Path 346 imports Encrypted-Formatted Data 312 from storage in Flash Memory 306 and outputs Encrypted Data 304 to Host 300.

In some embodiments, any portions of one or more operations of the Read Data Path 346 are performed by portions of one or more elements of SSD 101 of FIG. 1A. For example, portions of Data Processing 121 in conjunction with portions of Buffer 131, ECC 161, Device Interface Logic 191, and Device Interfaces 190 perform the operations of Read Data Path 346. In other embodiments, one or more of the aforementioned layers are implemented in one or more dedicated hardware logic circuitry blocks and/or one or more embedded processors and associated firmware. When SSD Controller 308 is implemented within a single integrated circuit, the single integrated circuit provides a secure physical boundary (not illustrated) ensuring that decrypted information in Decrypted Data 326 and Compressed Data 328, as well as any exchanged keys, are secure (e.g., from tampering or theft).

In some embodiments, before Encrypted-Formatted Data 312 is read from Flash Memory 306, Host 300 and Encrypted Transport SSD 302 establish a secure connection, and exchange session encryption/decryption keys. In some scenarios, the Host issues a Read Command, and a Retrieval Address, and then awaits delivery of Encrypted Data 304 by Encrypted Transport SSD 302. Host 300 uses the session decryption key (illustrated as $K_H$ in FIG. 3B) to decrypt the received data.

SSD Controller 308 imports Encrypted-Formatted Data 312 from Flash Memory 306. SSD Controller 308 de-formats the imported data at Read De-Formatting Layer 336, producing Back-End Encrypted Data 332, via techniques such as storage address mapping, decoding for error correction, and demodulating. Back-End Encrypted Data 332 is decrypted at Back-End Decryption Layer 338, producing Encrypted-Compressed Data 330. Encrypted Compressed Data 330 is decrypted at Internal Decryption Layer 340, producing Compressed Data 328. Compressed Data 328 is decompressed at Read Decompression Layer 342, producing Decrypted Data 326. Decrypted Data 326 is encrypted by Session Encryption Layer 344 using session encryption key $K_c$, producing Encrypted Data 304. A read operation is a reverse analog of a write operation. The Read De-Formatting Layer 336, decryption layers 338 and 340, Read Decompression Layer 342, and Session Encryption Layer 344 reverse the effects of the write operations that caused the data to be stored in Flash Memory 306.

When the encryption key $K_B$, used by Internal Encryption Layer 318 during a write, has been determined at least in part by meta-data such as a storage address range, or where respective encryption keys have been determined by a plurality of address ranges, or where a "none of the above" key was used because none of the address ranges matched, corresponding decryption keys are used by Internal Decryption Layer 340 to produce Compressed Data 328.

In a another embodiment of Read Data Path 346 (not illustrated), Internal Decryption Layer 340 is not present, enabling direct input of back-end decrypted data to Read Decompression Layer 342. In various embodiments, a single-stage, pre-decompression decryption read data path employs one of (a) back-end decryption, (b) transport session decryption as used by Host 300, and (c) decryption determined by a security protocol.

In another embodiment of Read Data Path 346 (not illustrated), data received by a host is not encrypted but is sent as clear-text. Session Encryption Layer 344 is not present, enabling Read Decompression Layer 342 to provide data directly to the Host. A value for internal decryption key $K_B$ is determined by a security protocol. Back-End Decryption Layer 338 reverses the back-end encryption used during writing data to the Flash Memory, using key $K_A$.

In another embodiment of Read Data Path 346 (not illustrated), both Internal Decryption Layer 340 and Session Encryption Layer 344 are not present, enabling direct input of back-end decrypted data to Read Decompression Layer 342, and enabling Read Decompression Layer 342 to provide data as clear-text directly to the Host. Back-End Decryption Layer 338 reverses the back-end encryption used during writing data to the Flash Memory, using one of (a) a back-end encryption key value, and (b) a value determined by a security protocol.

In yet other embodiments (not illustrated), data sent between a host and an encrypted transport SSD is selectively communicated encrypted and otherwise communicated as clear-text. For example, one or more address ranges of the host data are communicated in encrypted form (such as in accordance with respective keys, e.g. as in TCG-Opal), while other address ranges are communicated in clear-text form. For another example, a type of command from the host specifies whether data is communicated encrypted or as clear-text (such as read or write encrypted commands, as well as read or write clear-text commands).

In various embodiments, sufficient resources are implemented in an SSD controller to enable concurrent and non-interfering operation of a host-to-flash write data path (such as Write Data Path 310) and a flash-to-host read data path (such as Read Data Path 346), enabling concurrent and non-interfering bidirectional write and read operations between a host and an encrypted transport SSD. In other embodiments, any or all portions of write and read data paths are shared, preventing concurrent and/or non-interfering write and read operations between a host and an encrypted transport SSD, but enabling a reduction of hardware (e.g., in some situations advantageously reducing cost).

FIG. 4 is a flow diagram illustrating an embodiment of creation, use, and abandonment of a secure communication link between a host and an SSD controller for performing an encrypted transport data transfer, e.g., in a context of an encrypted transport SSD, such as illustrated and described with respect to FIGS. 2, 3A, and 3B. Host Actions 409 are illustrated on the right-hand side, while Controller Actions 419 are illustrated on the left.

In summary, a secure communication link is established, host and controller each authenticate the identity of the opposite party, symmetric encryption/decryption keys are exchanged, an encrypted data transfer takes place, and when completed, the communication link is disconnected and the controller destroys its copy of the symmetric encryption/decryption key.

At Start 401 the host makes Open Channel Request 402 that causes the controller to advance to Open Channel Accept 412. Open Channel Accept 412 is seen by the host and advances to Host-Side Authenticate 403. The controller advances to Controller-Side Authenticate 413. In some scenarios, once both sides have authenticated the identity of the opposite side, each side sends a public encryption key to the other side, completing the creation of a secure communication link.

Using the secure communication link the two sides exchange symmetric encryption/decryption keys (Controller-Side Key Exchange 414 and Host-Side Key Exchange 404). In some embodiments, an AES encryption technique is used, such as AES128, AES192, and AES256. In such an embodiment, a single key is used for both encryption and decryption by both sides ($K_C = K_H$).

A secure traffic exchange takes place (Controller-Side Secure Traffic Exchange 415 and Host-Side Secure Traffic Exchange 405) during which an encrypted data write operation, e.g., as described for FIG. 3A, an encrypted data read operation, e.g., as described for FIG. 3B, or both occur. For example, key $K_C$, as determined by the exchange of symmetric encryption/decryption keys, corresponds to key $K_C$ of Session Decryption Layer 314 of FIG. 3A and Session Encryption Layer 344 of FIG. 3B. Data sent from the host to the controller is designated by reference numeral 508 (Host-side Secure Traffic to Controller-Side 508), while data sent from the controller to the host is designated by reference numeral 510 (Controller-side Secure Traffic to Host-Side 510).

In some embodiments, a security protocol, operating conceptually "below" the secure traffic exchange, is optionally employed. The controller receives and stores information used to determine internal encryption/decryption keys and/or protocol information to enable controller-side security protocol based accesses, illustrated by Controller-Side TCG Ops/Storage Access 415X. The host determines and/or receives and then stores corresponding information used to determine internal encryption/decryption keys and/or protocol information to enable host-side security protocol based accesses, illustrated by Host-Side TCG Ops/Storage Access 405X. A secure traffic exchange with an optional security protocol uses the internal encryption/decryption keys and/or protocol information associated with Controller-Side TCG Ops/Storage Access s 415X to provide key information to Internal Encryption Layer 318 (host writes as illustrated in FIG. 3A) and Internal Decryption Layer 340 (host reads as illustrated in FIG. 3B). In some embodiments, e.g. some embodiments based on TCG Opal as the security protocol, the key information for the internal encryption/decryption layers is dependent upon one or more address ranges associated with a host request.

When the secure traffic exchange has completed, the host side advances to Close Channel Request 406 and the controller side advances to Close Channel Accept 416. The secure communication link is abandoned and the controller destroys its copy of the symmetric encryption/decryption key $K_c$ (Destroy Key 417).

FIG. 5 is a flow diagram illustrating an embodiment of data path control and/or operation of an encrypted transport SSD controller (such as illustrated and described with respect to FIGS. 2, 3A, 3B, and 4). In FIG. 5, write data path control operations 501-507 are on the left-hand side and read data path control operations 517-511 are on the right-hand side. The data path control and/or the operations apply to a two-stage post-compression encryption data path such as illustrated in FIGS. 3A and 3B, and correspond to events occurring during a Controller-Side Secure Traffic Exchange 415 of FIG. 4. An example operating context applicable to FIG. 5 is FIG. 1B, where, conceptually, Host 102 writes encrypted data via SSD Controller 100 to NVM 199, and reads encrypted data via the SSD Controller from NVM 199.

During a write operation, the SSD Controller receives encrypted write data (Receive Write Data 501) (e.g. from a host), and decrypts the encrypted write data (Decrypt Write Data 502) using exchanged encryption/decryption key $K_H$ ($K_C=K_H$) (Key=$K_H$ 522 K) (e.g., via 314 of FIG. 3A). The decrypted data is compressed (Compress Decrypted Data 503) (e.g., via 316 of FIG. 3A). The compressed data is encrypted (Encrypt Compressed Data 504) using an internal encryption key $K_B$ by an internal encryption layer (e.g., via 318 of FIG. 3A). The encrypted-compressed data is (Re)encrypted ((Re)encrypt Encrypted Data 505) using back-end encryption key $K_A$ (Key=$K_A$ 525 K) by a back-end encryption layer (e.g., via 320 of FIG. 3A). The back-end encrypted data is modulated (Modulate (Re)encrypted Data 506) (e.g., via 322 of FIG. 3A) and stored (Store Modulated Data 507) in NVM 199. In some embodiments, the internal encryption key $K_B$ is distinct from the key used for receiving the write data ($K_B \neq K_C$) (Key=$K_B$ 524 K). In other embodiments, a value for $K_B$ is determined by a security protocol, and in a specific embodiment $K_B$=KH. Reference numeral 508 (Host-side Secure Traffic to Controller-Side 508) represents data transferred from the Host to the SSD Controller, while reference numeral 510 (Controller-side Secure Traffic to Host-Side 510) represents data transferred from the SSD Controller to the Host.

During a read operation, the SSD Controller imports encrypted-formatted data from NVM 199 (Read Data 517), demodulates the read data (Demodulate Read Data 516) (e.g., via 336 of FIG. 3B). The demodulated data is decrypted (Decrypt Demodulated Data 515) (e.g., via 338 of FIG. 3B) and the result is decrypted again (Decrypt Decrypted Data 514) (e.g. via 340 of FIG. 3B). The result is decompressed (Decompress (Re)Decrypted Data 513) (e.g., via 342 of FIG. 3B), then encrypted (Encrypt Decompressed Data 512) (e.g., via 344 of FIG. 3B), and the resulting encrypted data is provided (Provide Encrypted Data 511) to Host 102.

Example Implementation Techniques

In some embodiments, various combinations of all or portions of operations performed by an encrypted transport SSD controller, e.g., with flash memories, a computing-host flash memory controller, and/or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flow-chart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via to some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A solid state drive (SSD), comprising:
a non-volatile memory; and
a controller circuit configured to, responsive to a transfer by the SSD of a first encryption key to a host device and receipt by the SSD of a write command from the host device to store an encrypted data set encrypted by the host device using the first encryption key to the non-volatile memory, decrypt the encrypted data set using the first encryption key to generate a decrypted data set, apply lossless compression to the decrypted data set to generate a decrypted compressed data set, encrypt the decrypted compressed data set using a second encryption key different from the first encryption key to generate an encrypted compressed data set, and to direct storage of the encrypted compressed data set in the non-volatile memory at a storage address identified by the write command, the controller circuit configured as a single integrated circuit to form a secure physical boundary for the decryption of the encrypted data set, the application of the lossless compression to the decrypted data set, and the encryption of the compressed data set.

2. The SSD of claim 1, wherein the controller circuit comprises a programmable processor with associated programming stored in a controller memory device.

3. The SSD of claim 1, wherein the controller circuit comprises a decryption hardware layer, a lossless compression hardware layer, an internal encryption hardware layer and a flash memory interface.

4. The SSD of claim 1, wherein the controller circuit is further configured to direct retrieval of the encrypted compressed data set from the non-volatile memory to a local buffer memory, to decrypt the encrypted compressed data set using the second encryption key to regenerate the decrypted compressed data set, to apply lossless decompression to the decrypted compressed data set to regenerate the decrypted data set, to encrypt the decrypted data set using the first encryption key to regenerate the encrypted data set, and to direct a transfer of the encrypted data set to a receiving device.

5. The SSD of claim 4, wherein the receiving device is a display device configured to display contents of the encrypted data set to a user.

6. The SSD of claim 4, wherein the receiving device is the host device.

7. The SSD of claim 1, wherein the non-volatile memory is characterized as a flash memory device.

8. The SSD of claim 1, wherein the lossless compression uses a Lempel Ziv (LZ) compression algorithm.

9. The SSD of claim 1, wherein the controller circuit employs a public key encryption algorithm.

10. The SSD of claim 1, wherein the controller circuit is further configured to, responsive to establishment of a secure communication link with the host device over a network, transfer the first encryption key to the host device via the secure communication link to facilitate generation of the encrypted data set by the host device.

11. The SSD of claim 1, wherein the controller circuit is further configured to format the encrypted compressed data set for storage in the non-volatile memory.

12. An apparatus comprising:
a remote server comprising a processor and memory, the memory storing a data set; and
a solid state drive (SSD) connected to the remote server over a network and comprising a non-volatile memory and a controller circuit;
the remote server configured to establish a secure link over the network between the remote server and the SSD;
the controller circuit configured to transfer a first encryption key to the remote server via the secure link;
the remote server further configured to encrypt the data set using the first encryption key to generate an encrypted data set;
the remote server further configured to transfer the encrypted data set to the SSD via the secure link;
the controller circuit further configured to decrypt the encrypted data set using the first encryption key to generate a decrypted data set;
the controller circuit further configured to apply lossless compression to the decrypted data set to generate a decrypted compressed data set;
the controller circuit further configured to encrypt the decrypted compressed data set using a second encryption key different from the first encryption key to generate an encrypted compressed data set;

the controller circuit further configured to direct storage of the encrypted compressed data set at a storage address identified by a write command in the non-volatile memory, the controller circuit configured as a single integrated circuit to form a secure physical boundary for the decrypting, applying and encrypting steps.

13. The apparatus of claim 12, further comprising a local display device connected to the SSD and configured to display the data set to a user, wherein the controller circuit is further configured to transfer the data set to the local display device by directing a retrieval of the encrypted compressed data set from the non-volatile memory to a local buffer memory of the SSD, decrypting the encrypted compressed data set using the second encryption key to regenerate the decrypted compressed data set, applying lossless decompression to the decrypted compressed data set to regenerate the decrypted data set, encrypting the decrypted data set using the first encryption key to regenerate the encrypted data set, and to direct a transfer of the encrypted data set to the local display device.

14. The apparatus of claim 13, wherein the local display device comprises a decryption engine which decrypts the encrypted data set transferred from the SSD using the first encryption key and outputs the decrypted data set to a display.

15. A computer-implemented method comprising:
using a solid state disk (SSD) device having a controller circuit and a non-volatile memory to transmit a first encryption key to a host device;
receiving, by the SSD device, an encrypted data set from the host device, the encrypted data set encrypted by the host using the first encryption key;
decrypting, by the controller circuit, the encrypted data set using the first encryption key to generate a decrypted data set;
applying, by the controller circuit, lossless compression to the decrypted data set to generate a decrypted compressed data set;
encrypting, by the controller circuit, the decrypted compressed data set using a second encryption key different from the first encryption key to generate an encrypted compressed data set; and
storing the encrypted compressed data set in at the storage address identified by a write command in the non-volatile memory of the SSD data storage device, the controller circuit configured as a single integrated circuit to form a secure physical boundary for the decrypting, applying and encrypting steps.

16. The method of claim 15, further comprising formatting the encrypted compressed data set for storage in the non-volatile memory.

17. The method of claim 15, further comprising subsequent steps of:
retrieving the encrypted compressed data set from the non-volatile memory;
decrypting, by the controller circuit, the encrypted compressed data set using the second encryption key to regenerate the decrypted compressed data set;
applying, by the controller circuit, lossless decompression to the decrypted compressed data set to regenerate the decrypted data set;
encrypting, by the controller circuit, the decrypted data set using the first encryption key to regenerate the encrypted data set; and
transferring the encrypted data set to a receiving device.

18. The method of claim 15, wherein the non-volatile memory is characterized as a flash memory of the SSD device.

* * * * *